United States Patent [19]
Allen et al.

[11] Patent Number: 5,151,990
[45] Date of Patent: Sep. 29, 1992

[54] NONVOLATILE MEMORY MANAGEMENT IN A DATA PROCESSING NETWORK

[75] Inventors: James D. Allen; Steven A. King, both of Austin, Tex.

[73] Assignee: International Business Machines Corporation, Armonk, N.Y.

[21] Appl. No.: 573,745

[22] Filed: Aug. 28, 1990

[51] Int. Cl.⁵ .............................................. G06F 13/00
[52] U.S. Cl. ............................... 395/650; 364/242.94; 364/259.2; 395/425
[58] Field of Search ............................ 395/650, 425; 364/200 MS File, 900 MS File

[56] References Cited

U.S. PATENT DOCUMENTS 4,240,143 12/1980 Besemer et al. ..................... 364/200
4,792,896 12/1988 MacLean et al. .................... 364/200
4,887,075 12/1989 Hirasawa ......................... 364/200 X
4,887,204 12/1989 Johnson et al. ..................... 364/200

*Primary Examiner*—Thomas M. Heckler
*Attorney, Agent, or Firm*—Casimer K. Salys

[57] ABSTRACT

A system and method for managing the nonvolatile memory capacity of individual workstations within a data processing network having a multiplicity of workstations with resident nonvolatile memory devices. In the context of the embodying network, the invention provides for a selective querying of workstations to determine unused disk capacity, a comparison of such capacity to a threshold defined for the respective workstation, and the generation of an event message indicating sub-threshold capacity. The event is subject to local or network logging, and can include information identifying the workstation and its disk capacity status. A refinement of the invention contemplates the reallocation of disk capacity within the network to avoid premature termination of programs executing on a workstation upon the finding of a sub-threshold capacity in the workstation.

14 Claims, 3 Drawing Sheets

NONVOLATILE MEMORY MANAGEMENT IN A DATA PROCESSING NETWORK

BACKGROUND OF THE INVENTION

The present invention relates generally to memory management. More particularly, the invention is directed to a system architecture and method for managing nonvolatile data storage devices individually resident within workstations (personal computers) which are themselves the elements of a network.

A representative workstation includes a processor with volatile memory, a video display a keyboard with mouse, a printer, and a nonvolatile data storage device, such as a hard (fixed) disk or functionally equivalent optical disk or tape drive apparatus. In the context of a network, the workstation represents a terminal which interfaces to the network using the protocol of the network. The protocol may be provided directly by a networking card in the workstation or the consequence of a terminal emulation program executing on the workstation.

Network connected workstations are proliferating with the increased use of word processing, databases, and electronic communication. The increasing presence of workstations and networks thereof in the workplace has created a situation in which average human user of a workstation is significantly less experienced and knowledgeable in the system idiosyncrasies. Nevertheless the user and the system are expected to exhibit increase productivity. Workstation error messages and the associated down time are clearly undesirable. In this context a particularly vulnerable aspect of each workstation has been the capacity of the nonvolatile memory resident at the individual workstation.

Capacity related hard disk failures. i.e., operational interrupts and associated error messages, occur when the data being conveyed to nonvolatile storage exceeds the disk capacity. Consequently, the operational interrupt and associated error message to the workstation user occurs at a time and under a condition when such workstation user is least capable of easily correcting the situation. Such failures of the hard disk are particularly disruptive when the error messages require the workstation user to respond by selectively deleting data from the hard disk before completing the operation so interrupted. The less experienced the workstation user, the more disruptive is the event and complex the corrective action.

Consequently, there exists the need for a system and method for managing a network composed of multiple workstations having independent and workstation resident nonvolatile memory devices with resources to anticipate and reallocate nonvolatile memory within the network. The system and method should minimize workstation down time and user involvement.

SUMMARY OF THE INVENTION

The present invention exhibits a number of related features, which features are used to discern and identify nonvolatile memory capacity problems in workstations connected to a network. One of the nonvolatile memory capacity management features of the present invention involves the automated determination of unused memory capacity for selected workstations in the network. A second aspect of the invention involves the establishment of capacity thresholds, which thresholds define minimum acceptable unused memory capacity by workstation and time. In its third aspect, the invention relates to event characterization, whereby event signals generated as a consequence of capacity threshold violations provide both workstation local and network wide error log messages suitable to identify the particulars of the capacity problem and the workstation to which it relates.

According to a preferred practice of the invention, workstation resident hard disk capacity memory management in a network of workstations is effectuated by periodically enabling a workstation resident disk capacity monitor program, operating such program to determine for selected workstations the unused disk capacity, comparing such determined unused capacity to a threshold defined previously for each workstation, generating an error message when the capacity limit is violated, and logging the message at the workstation and within the network. Preferably, the workstation disk capacity queries are automated in a timed sequence.

The invention also contemplates a selective reallocation or sharing of disk space within the network to temporarily correct for deficiencies in the disk capacity of a workstation and thereby preclude incipient disk failure situation. Temporary disk reallocation within the network can be initiated by the log of a disk error message within the network or upon a workstation request following the detection of such incipient disk capacity problem. These features provide the basic tools for a network administrator to monitor the use of disk space within the system in the course of managing both network and workstation memory resources over the long term.

These and other features of the invention will be more clearly understood and fully appreciated upon considering the embodiment described hereinafter.

DESCRIPTION OF THE PREFERRED EMBODIMENT

Figure 1:
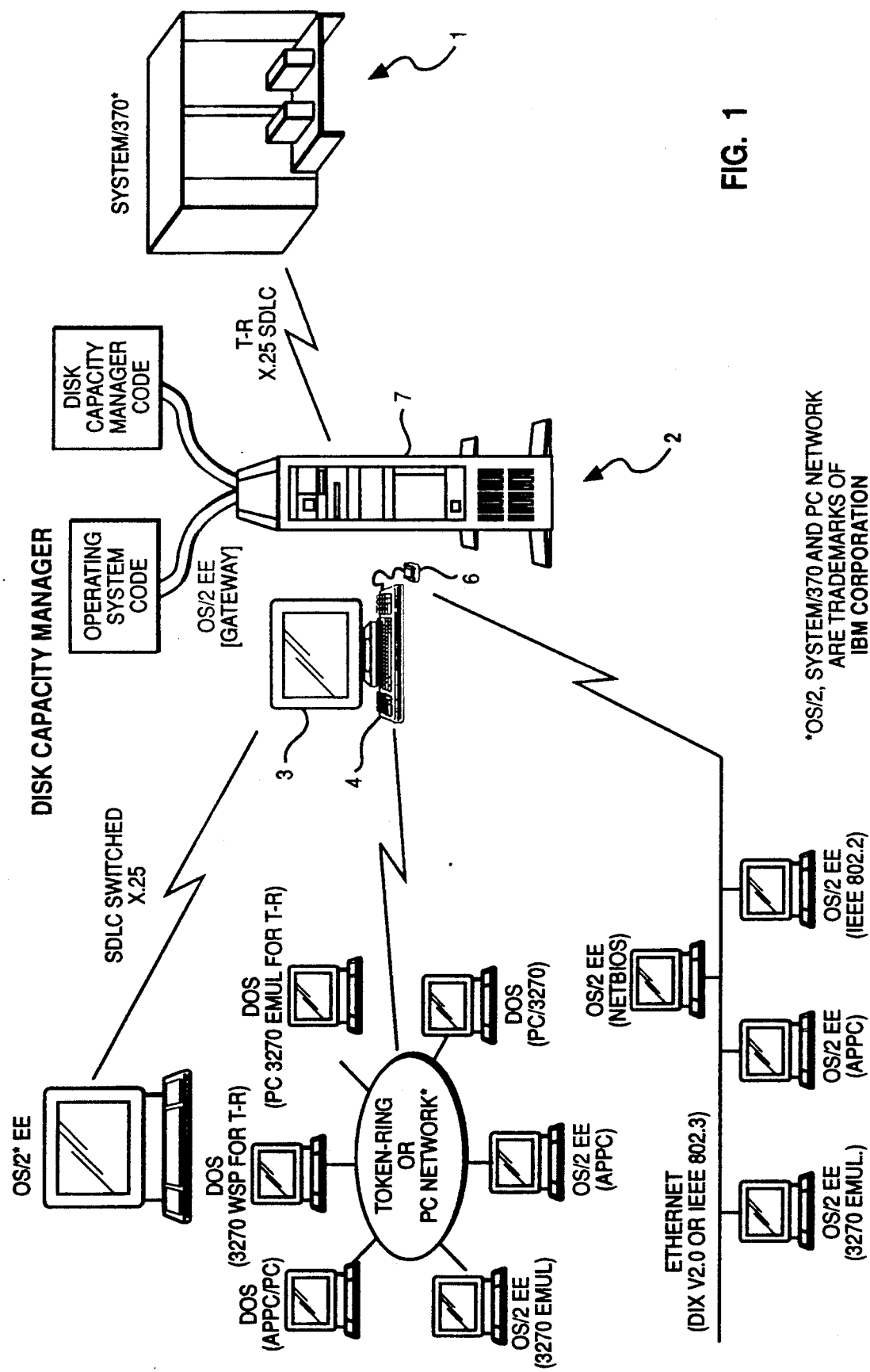
FIG. 1 is a schematic depicting a multiplicity of workstations connected in a network.

FIG. 1 schematically depicts the architecture of a network within which the invention is preferably practiced. The protocols of the depicted networks include, without limiting, ethernet, token-ring, SDLC, and that of the PC NETWORK TM product and this illustrates the diversity of environments within which the present memory (hard disk) capacity management invention can be practiced. As shown, a host computer, such as the IBM Corporation System/370 TM mainframe is connected by way of a token ring, X.25, or SDLC communications link to gateway workstation 2 and therethrough into the three basic network types selectively using SDLC Switched, X.25, the ethernet, the token-ring and PC NETWORK technologies. The hardware at each workstation preferably includes, as depicted in association with gateway workstation 2, a display 3, a keyboard 4 a mouse 6 and a system unit 7. The system unit 7 houses a processor, one or more communication boards, a volatile memory array, and hard disk nonvolatile memory. The nonvolatile memory can include various forms of disk drives, e.g., floppy, hard and optical, and fully encompasses other nonvolatile storage media such as tape drives or nonvolatile semiconductor devices. Gateway workstation 2 is preferably a Personal System/2 ® (PS/2 ®) computer running with an Operating System/2 ™ Extended Edition (OS/2 ® EE) operating system. The remaining workstations also preferably use Personal System/2 computers with the OS/2 EE operating system. These hardware and software products are generally available from International Business Machines Corporation.

The communication links and associated communications circuits by which the various workstations depicted in FIG. 1 interact utilize protocol standards commonly known within the industry. For example, X.25, SDLC (synchronous data link control), switched SDLC, token-ring, ethernet, APPC (advanced program to program communications) and IBM 3270 terminal are protocols substantially defined by government or industry standards. The protocol of the PC NETWORK product is established by International Business Machines Corp. To implement such protocols the individual workstations have communications circuitry and software, typically board type components, which generate the appropriate electrical signals for the depicted ethernet, token-ring, SDLC switched, or X.25 communication links. Preferably, the operating system software incorporates as modules thereof driver code suitable to implement the communication functions. For instance, the aforementioned OS/2 EE code incorporates SDLC drivers, X.25 drivers, token-ring drivers, netbios drivers, IEEE 802.2 drivers, APPC drivers, and 3270 terminal emulation drivers. Workstations using the somewhat more restrictive DOS (disk operating system) operating systems can still include code for APPC/PC, 3270 WSP (workstation program) for token-ring. PC 3270 terminal emulation for token-ring, or PC/3270 drivers for token-ring or PC NETWORK product drivers. Given this diversity of networks and protocols, it should be apparent that the management of nonvolatile memory, hereinafter generally referred to as disk capacity, must define a system environment and practice which is compatible with the broad spectrum of workstation networks in the industry. The present invention defines systems and methods suitable to monitor workstation specific disk capacity, to establish thresholds therefore, and to initiate network level notice of a need for corrective action for the networks in FIG. 1.

The aforementioned OS/2 EE operating system does provide a workstation user with the ability to determine disk capacity for the immediately associated workstation. This is accomplished by calling up and running the utility program identified as CHKDSK. The size of the disk being queried as well as the remaining capacity thereof are provided as an output to the workstation user. However, the queries are limited to the OS/2 EE operating system resident workstation.

The present invention contemplates network wide management of disk capacity, and defines in such a context features which are transparent to the diverse forms of networks described with reference to FIG. 1. Furthermore, the system and method for managing disk capacity as defined herein is not constrained to reside solely on host computer 1, or on gateway workstation 2, or on any one of the other individual workstations linked within the network. This flexibility derives from the invention concept that the management function should be operable from any location remote to the individual workstation, should reduce the number of aborted operations caused by disk capacity deficiencies, and should lower the associated user level of skill requirements.

A first important feature of the invention involves the ability to access a workstation from a remote location within the network, undertaken to obtain measures of the unused disk capacity by individual logical drive or for all drives resident at the queried workstation. The results of such query are displayed, conveyed to a file or printed, upon the discretion of the manager. The query operation is invoked by a command line or via an application programming interface (API). The timing of the query can be automated to occur at specified timed intervals, employing a timer function such as is presently available in aforementioned OS/2 EE operating system.

A second aspect of the invention relates to the establishment of disk capacity thresholds. This feature provides the user with the ability to remotely establish a minimum remaining disk capacity. The threshold is established through a command line, via a remote network function, or by using an API operation. Given that it is an externally defined threshold, it is subject to revision by the entity defining the operating parameters within the network.

A further aspect of the invention relates to the generation of an event, hereinafter identified as an error message, within the network upon the identification of a workstation with remaining nonvolatile disk capacity below the established threshold. The invention contemplates the generation of an error message suitable for log at the local, network, or host level within the network. For example, the error message log can be displayed directly to the screen of the resident terminal user, written to a file, printed, or used to enable an NMVT (network management vector transport) of the type routinely conveyed to the host. Preferably, such error message includes information for determining the amount of unused disk capacity remaining, the workstation type, and workstation location.

A further contemplated enhancement of the invention involves an error message responsive dynamic reallocation of available disk capacity within the network. This additional feature would ensure that unexpected and above capacity demands by one or more workstations within the network would not result in aborted operations during the interim between the generation of an error message and the conclusion of correct by the network manager.

Figure 2A:
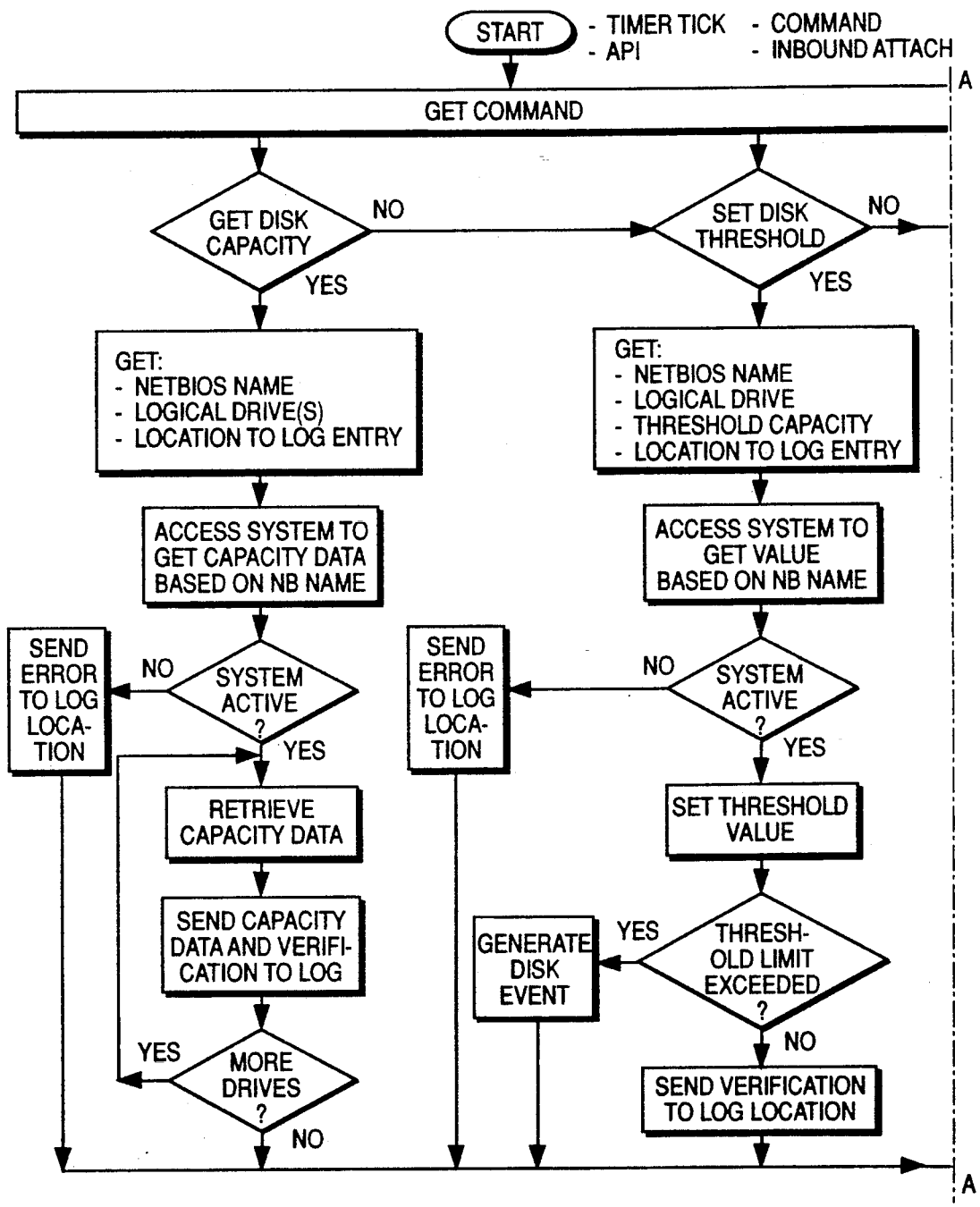
FIGS. 2A and 2B are a flow diagram depicting operations provided by the invention.
Figure 2B:
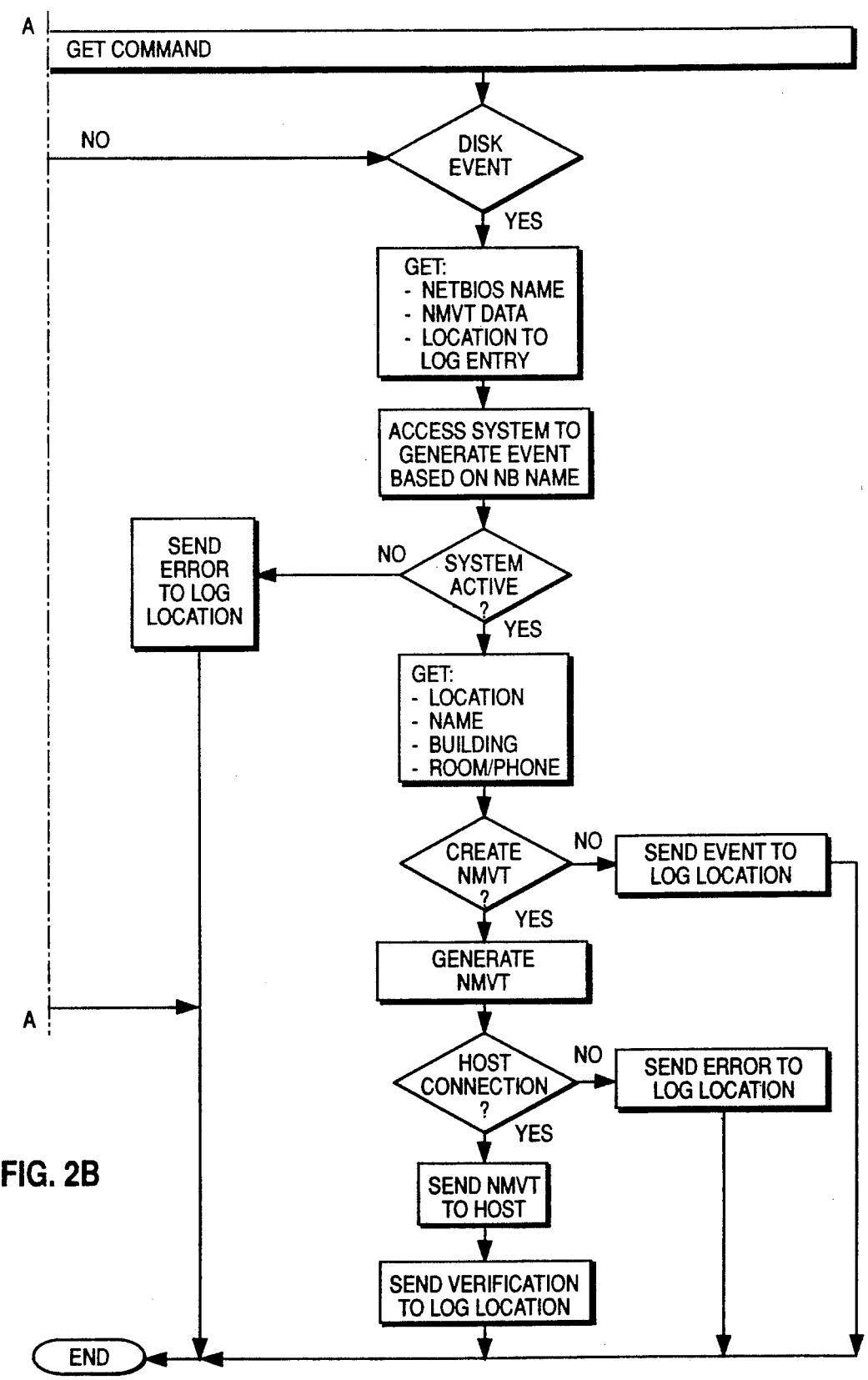

FIGS. 2A and 2B define by flow diagram a preferred practice of the invention in the context of the system depicted in FIG. 1. Disk capacity queries are started by a time ticker, an API, a command line entry, or an inbound attach operation. If the GET command associated with the start involves the determination of disk capacity, the workstation netbios location data, the disk drive characteristics, and the error message log location must be defined to enable accessing. When the workstation subject to accessing is inactive, an error message is logged. For an active workstation, a command is conveyed from the host to the workstation to first retrieve capacity data and thereafter log such data to the prescribed log destination. When multiple disk drives are involved, the query and logging processes are repeated for each of the drives in succession. Thereafter, the get disk capacity operation is concluded.

The start command for invoking the set disk threshold operation undertakes to determine the netbios data, the disk drive of the workstation subject to threshold comparison, the threshold value, and the location for logging the associated error message data. The identified disk is then queried, if the system is active, to determine the capacity actually remaining. When the workstation or network subject to query are found to be inactive, an error message is logged and threshold determination is terminated. If the threshold in an active system is lower than the remaining disk capacity, verification of adequate capacity is logged. On the other hand, when the threshold is determined to be greater than the remaining capacity, an error message is generated.

As a third specifically defined option within the operating modes of the system, the start operation is enabled to query a workstation and selectively log the derived error message data within the network. In such case, the system receives the netbios location of the workstation, the NMVT data for the host, and the location for logging different error messages. The workstation prescribed by the netbios name is accessed to determine whether it is active. If inactive, an error message is logged. For an active network, the location, name and other workstation identification data are derived for generating the host NMVT message. In the event the system does not provide an NMVT protocol, the workstation information is sent directly to a log. If the NMVT protocol is selected, the host is queried to confirm that it is active and, if active, notified of the workstation location having the disk event error message. An local error message is logged if the host is inactive or not connected.

Pseudocode, from which source code can be derived, particularizes how each of the operations defined in FIGS. 2A and 2B can be accomplished within the network of FIG. 1. Such code defines the determination of disk capacity, the establishment of a minimum capacity threshold, and the logging of disk event error messages. The input command is provided by a time ticker, such as aforementioned OS/2 EE, an API, a command line entry, or an inbound attach associated with another command. The command so read determines whether the system will undertake the "get disk capacity", "set disk threshold" or log a "disk event".

DISK CAPACITY MANAGER PSEUDOCODE

```
START EXECUTION BY TIMER TICK OR API OR COMMAND OR
  IN BOUND ATTACH
READ COMMAND
IF COMMAND = "GET DISK CAPACITY" THEN
    GET MACHINE NAME, LOGICAL DRIVE(S),
      LOCATION TO LOG ENTRY
    ACCESS SYSTEM, BASED ON MACHINE NAME
    IF MACHINE IS ACTIVE THEN
        LOOP:
        RETRIEVE CAPACITY DATA FOR DRIVE
        SEND CAPACITY DATA AND VERIFICATION TO LOG
        IF THERE ANY MORE DRIVES TO GET CAPACITY
          INFORMATION FROM THEN
            GOTO LOOP:
        END
    ELSE IF MACHINE IS NOT ACTIVE THEN
        SEND ERROR TO LOG LOCATION
    END
ELSE IF COMMAND = "SET DISK THRESHOLD" THEN
    GET MACHINE NAME, LOGICAL DRIVE,CAPACITY
      INFO.,LOCATION TO LOG ENTRY
    ACCESS SYSTEM BASED ON MACHINE NAME
    IF MACHINE IS ACTIVE THEN
        SET THE THRESHOLD VALUE ON THE SYSTEM
        IF THE THRESHOLD EXCEEDED WITH THAT THRESHOLD
          VALUE THEN
            CALL "DISK EVENT" PROCESS
        ELSE IF THE ANSWER = "NO" THEN
            SEND VERIFICATION TO LOG
        END
    ELSE IF MACHINE IS NOT ACTIVE THEN
        SEND ERROR TO LOG LOCATION
    END
ELSE IF COMMAND = "DISK EVENT" THEN
    GET MACHINE NAME, NMVT DATA, LOCATION TO LOG ENTRY
    ACCESS SYSTEM BASED ON MACHINE NAME
    IF THE SYSTEM IS ACTIVE THEN
        GET USER LOCATION, NAME, BUILDING, ROOM NUMBER,
          AND TELEPHONE NUMBER
        IF A NMVT IS SPECIFIED THEN
            GENERATE NMVT
            IF THERE IS A HOST CONNECTION THEN
                SEND NMVT TO HOST
                SEND VERIFICATION TO LOG LOCATION
            END
            ELSE IF ANSWER = "NO" THEN
                SEND ERROR TO LOG LOCATION
            END
        ELSE IF ANSWER = "NO" THEN
            SEND EVENT AND VERIFICATION TO LOG LOCATION
    ELSE IF THE SYSTEM IS NOT ACTIVE THEN
        SEND ERROR TO LOG LOCATION
```

| -continued |
| --- |
| DISK CAPACITY MANAGER PSEUDOCODE |
| END |

The full breadth of the invention, as noted earlier, includes systems and methods for reallocating nonvolatile memory such as disk capacity within the network in response to the logging of a disk event (error message), for a workstation having sub-threshold capacity. The reallocation of disk capacity can be localized to the network of the workstation, such as within the token-ring or PC NETWORK illustrated in FIG. 1, or, if desired, can be allocated at the gateway 2 or host 1 levels.

The invention thus provides a network system, and a program for using such system, to eliminate nonvolatile memory capacity errors which heretofore routinely caused premature termination of programs executing on workstations. The invention provides a system and a method for ascertaining the unused nonvolatile memory capacity of individual workstations within the network, for establishing minimum unused memory capacity thresholds for such workstations, and for selectively logging deficiency information attributable to sub-threshold remaining memory capacity. The operations can be invoked by command line entry, by enabling API, or AT automated time intervals. The reporting of the error messages, disk events, can be performed locally or remotely, and conveyed to a file, a printer or even a display screen. In a refined form, the invention also contemplates the selective temporary reallocation of nonvolatile memory within the network upon the logging of a sub-threshold capacity in a workstation. Thus, the user of a workstation is no longer obliged to learn how to terminate a running program and to selectively delete hard disk files in event a nonvolatile memory capacity deficiency is encountered.

The invention is fully applicable to workstations having resident nonvolatile memory without regard to particular form, including floppy, hard/fixed and optical disks, tape storage media as well as semiconductor nonvolatile memory.

Though the invention has been described and illustrated by way of specific embodiments, the apparatus and methods of the invention should be understood to encompass the full breadth of structures and practices defined by the claims set forth hereinafter.

We claim:

1. A system for managing memory capacity in a data processing network connected to communicate data in specified protocol between multiple workstations with resident nonvolatile memory devices, comprising:
   means for selectively querying a workstation connected on the network to determine the respective unused nonvolatile memory;
   means for comparing the determined unused nonvolatile memory to a respective minimum capacity threshold value; and
   means for generating event response data in the network to signify that the unused nonvolatile memory at the queried workstation is below the threshold value.

2. The system recited in claim 1, wherein the means for generating identifies the selected workstation.

3. The system recited in claim 2, wherein the means for selectively querying interrogates respective workstations to obtain workstation resident unused disk capacity.

4. A method for managing memory capacity in a data processing network connected to communicate data in specified protocol between multiple workstations with resident nonvolatile memory devices, comprising the steps of:
   selectively querying a workstation connected on the network to determine the respective unused nonvolatile memory;
   comparing the determined unused nonvolatile memory to a respective minimum capacity threshold value; and
   generating event response data in the network to signify that the unused nonvolatile memory at the queried workstation is below the threshold value.

5. The process recited in claim 4, wherein the generated event response identifies the selected workstation within the network.

6. The process recited in claim 5, wherein the generated event response is transmitted from the selected workstation to a network log.

7. The process recited in claim 6, wherein the query retrieves and logs workstation resident unused disk capacity information from the selected workstation.

8. The process recited in claim 6, wherein the generated event response causes an allocation of workstation resident nonvolatile memory within the network to the selected workstation.

9. The process recited in claim 4, wherein the selected query is periodically enabled.

10. The process recited in claim 9, wherein the selection is controlled by a workstation other than the one subject to the query or by a host computer.

11. The process recited in claim 10, wherein the generated event identifies the selected workstation within the network.

12. The process recited in claim 11, wherein the generated event response is transmitted from the selected workstation to a network log.

13. The process recited in claim 12, wherein the query retrieves and logs workstation resident unused disk capacity information from the selected workstation.

14. The process recited in claim 11, wherein the generated event response causes an allocation of workstation resident nonvolatile memory within the network to the selected workstation.

* * * * *